US011991693B2

United States Patent
Gao et al.

(10) Patent No.: US 11,991,693 B2
(45) Date of Patent: May 21, 2024

(54) GROUP-SPECIFIC RESOURCE INDICATIONS FOR UPLINK TRANSMISSIONS

(71) Applicant: ZTE Corporation, Guangdong (CN)

(72) Inventors: Bo Gao, Guangdong (CN); Zhaohua Lu, Guangdong (CN); Yu Ngok Li, Guangdong (CN); Ke Yao, Guangdong (CN); Chuangxin Jiang, Guangdong (CN); Hao Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 434 days.

(21) Appl. No.: 17/246,432

(22) Filed: Apr. 30, 2021

(65) Prior Publication Data
US 2021/0329673 A1 Oct. 21, 2021

Related U.S. Application Data

(63) Continuation of application No. PCT/CN2018/113834, filed on Nov. 2, 2018.

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04L 25/0226* (2013.01);
(Continued)

(58) Field of Classification Search
CPC .. H04B 7/0404; H04B 7/0617; H04B 7/0684; H04B 7/0695; H04L 5/0051;
(Continued)

(56) References Cited

U.S. PATENT DOCUMENTS 9,537,547 B1 * 1/2017 Kazeminejad ....... H04B 7/0421
10,097,324 B2 10/2018 Behravan et al.
(Continued)

FOREIGN PATENT DOCUMENTS

CN 101969337 A 2/2011
CN 102714587 A 10/2012
(Continued)

OTHER PUBLICATIONS

Huawei et al., Remaining issues on SRS design, Mar. 26, 2018, 3GPP TSG RAN WG1 Meeting #92, Athens, Greece, Agenda Item: 7.1.2.3.5, Tdoc: R1-1801806 (Year: 2018).*

(Continued)

*Primary Examiner* — Eric Nowlin
(74) *Attorney, Agent, or Firm* — Perkins Coie LLP

(57) ABSTRACT

Methods, systems, and devices for group-specific resource indications in mobile communication systems are described. An exemplary method for wireless communication includes determining, by a network node, an association among one set of one or more reference signals (RSs) and one or more groups, where each of the one or more RSs is associated with a usage or a time-domain behavior, and transmitting, to the terminal, a signaling message comprising the association. Another exemplary method for wireless communication includes determining, by the network node, a reference signal (RS) configuration, wherein the RS configuration comprises an association between one or more target RSs and a spatial granularity, and transmitting, to a terminal, a message comprising the RS configuration.

19 Claims, 13 Drawing Sheets

(51) Int. Cl.
H04L 25/02 (2006.01)
H04W 16/28 (2009.01)
H04W 72/044 (2023.01)
H04W 72/23 (2023.01)

(52) U.S. Cl.
CPC ......... *H04W 16/28* (2013.01); *H04W 72/046* (2013.01); *H04W 72/0466* (2013.01); *H04W 72/23* (2023.01)

(58) Field of Classification Search
CPC .. H04L 5/0053; H04L 25/0226; H04W 16/28; H04W 72/046; H04W 72/0466; H04W 72/1273; H04W 72/23; Y02D 30/70
See application file for complete search history.

(56) References Cited

U.S. PATENT DOCUMENTS

| | | | |
|---|---|---|---|
| 10,574,307 | B2 | 2/2020 | Li et al. |
| 10,985,946 | B2 * | 4/2021 | Choi ............... H04L 5/0051 |
| 11,190,320 | B2 * | 11/2021 | Choi ............ H04W 72/1268 |
| 11,228,464 | B2 * | 1/2022 | Rahman ........... H04L 25/0226 |
| 11,277,240 | B2 * | 3/2022 | Zhang ............... H04B 1/713 |
| 11,350,425 | B2 * | 5/2022 | Guan ............... H04L 67/34 |
| 11,418,368 | B2 * | 8/2022 | Park ............... H04L 25/0224 |
| 2018/0083680 | A1 | 3/2018 | Gua et al. |
| 2018/0206132 | A1 | 7/2018 | Guo et al. |
| 2018/0323928 | A1 * | 11/2018 | Yang ............... H04L 5/0048 |
| 2018/0367205 | A1 * | 12/2018 | Liu ............... H04B 7/0486 |
| 2020/0092055 | A1 * | 3/2020 | Choi ............... H04L 5/005 |
| 2020/0204316 | A1 * | 6/2020 | Zhang ............... H04L 5/0007 |
| 2020/0244489 | A1 * | 7/2020 | Rahman ............... H04L 5/001 |
| 2020/0252241 | A1 * | 8/2020 | Park ............... H04L 25/0224 |
| 2020/0295973 | A1 * | 9/2020 | Choi ............... H04L 5/0051 |
| 2021/0153215 | A1 * | 5/2021 | Guan ............... H04L 67/303 |
| 2022/0021561 | A1 * | 1/2022 | Tang ............... H04W 72/12 |
| 2022/0095339 | A1 * | 3/2022 | Yang ............... H04W 52/10 |
| 2022/0369321 | A1 * | 11/2022 | Guan ............... H04B 7/0617 |
| 2023/0009319 | A1 * | 1/2023 | Manolakos ......... H04L 27/261 |
| 2023/0063015 | A1 * | 3/2023 | Muruganathan ...... H04L 5/0023 |
| 2023/0198719 | A1 * | 6/2023 | Wang ............... H04B 7/024 370/329 |

FOREIGN PATENT DOCUMENTS

| | | | | |
|---|---|---|---|---|
| CN | 108023717 | A | | 5/2018 |
| CN | 108476051 | A | | 8/2018 |
| CN | 111092708 | A | * | 5/2020 ........... H04L 5/0048 |
| CN | 110830209 | B | * | 4/2021 ........... H04B 7/0617 |
| CN | 111213417 | B | * | 11/2022 ........... H04B 1/713 |
| EP | 3665826 | A1 | * | 6/2020 ........ H04L 25/0226 |
| EP | 3806373 | A1 | * | 4/2021 ........ H04B 7/0617 |
| WO | WO-2017027055 | A1 | * | 2/2017 ............ H04B 7/024 |
| WO | 2017142574 | A1 | | 8/2017 |
| WO | 2018144810 | A1 | | 8/2018 |
| WO | WO-2019030413 | A1 | * | 2/2019 ........ H04L 25/0226 |
| WO | WO-2019066560 | A1 | * | 4/2019 ........... H04B 1/713 |
| WO | WO-2019190236 | A1 | * | 10/2019 ........... H04L 5/0048 |
| WO | WO-2020030050 | A1 | * | 2/2020 ........... H04B 7/0617 |
| WO | WO-2021088851 | A1 | * | 5/2021 ........... H04L 5/0048 |
| WO | WO-2022051151 | A1 | * | 3/2022 | |
| WO | WO-2023050234 | A1 | * | 4/2023 | |
| WO | WO-2024030528 | A1 | * | 2/2024 | |

OTHER PUBLICATIONS

Samsung, Issues on SRS, Mar. 26, 2018, 3GPP TSG RAN WG1 Meeting #92, Athens, Greece, Agenda Item: 7.1.2.3.5, Tdoc: R1-1801971 (Year: 2018).*
Huawei et al., UL SRS design for beam management and CSI acquisition, Aug. 21, 2017, 3GPP TSG RAN WG1 Meeting #90, Prague, Czech Republic, Agenda Item: 6.1.2.3.5, Tdoc: R1-1712238 (Year: 2017).*
Huawei et al., SRS antenna switching, Aug. 21, 2017, 3GPP TSG RAN WG1 Meeting #90, Prague, Czech Republic, Agenda Item: 6.1.2.3.8, Tdoc: R1-1712240 (Year: 2017).*
Huawei et al., Remaining issues on SRS design, Feb. 26, 2018, 3GPP TSG RAN WG1 Meeting #92, Athens, Greece, Agenda Item: 7.1.2.3.5, Tdoc: R1-1801806 (Year: 2018).*
Samsung, Issues on SRS, Feb. 26, 2018, 3GPP TSG RAN WG1 Meeting #92, Athens, Greece, Agenda Item: 7.1.2.3.5, Tdoc: R1-1801971 (Year: 2018).*
OPPO, Remaining Issues on SRS, Feb. 26, 2018, 3GPP TSG RAN WG1 Meeting #92, Athens, Greece, Agenda Item: 7.1.2.3.5, Tdoc: R1-1802100 (Year: 2018).*
Ericsson, Remaining Issues on SRS, Feb. 26, 2018, 3GPP TSG RAN WG1 Meeting #92, Athens, Greece, Agenda Item: 7.1.2.3.5, Tdoc: R1-1802756 (Year: 2018).*
Lenovo et al., Maintenance for non-codebook based UL transmission, Oct. 8, 2018, 3GPP TSG RAN WG1 Meeting #94bis, Chengdu, China, Agenda Item: 7.1.2.1, Tdoc: R1-1810570 (Year: 2018).*
Nokia et al., Summary of issues on UL non-codebook based transmission, Oct. 8, 2018, 3GPP TSG RAN WG1 Meeting #94bis, Chengdu, China, Agenda Item: 7.1.2.1, Tdoc: R1-1811840 (Year: 2018).*
Chinese Office action dated Jul. 5, 2022, from corresponding Chinese Application No. 201880099144.3.
Partial European Search Report in EP Patent Application No. 18929979.5, dated Oct. 8, 2021, 17 pages.
Huawei, et al., "Correction to SRS-Config," 3GPP TSG-RAN WG2 Meeting #103bis, R2-1815921, Chengdu, China, Oct. 8-12, 2018, 7 pages.
CIPO, Notice of Allowance for Canadian Application No. 3,118,375, dated Apr. 3, 2023, 2 pages.
EPO, Communication pursuant to Article 94(3) for European Application No. 18929979.5, dated Apr. 25, 2023, 5 pages.
International Search Report and Written Opinion in International Application No. PCT/CN2018/113834, dated Jul. 29, 2019, 7 pages.
European Search Report in EP Patent Application No. 18929979.5, dated Jan. 11, 2022, 14 pages.
CNIPA, Notification to Complete Formalities of Registration for Chinese Patent Application No. 201880099144.3 dated Dec. 2, 2022, 4 pages with unofficial translation.

* cited by examiner

US 11,991,693 B2

GROUP-SPECIFIC RESOURCE INDICATIONS FOR UPLINK TRANSMISSIONS

CROSS-REFERENCE TO RELATED APPLICATIONS

This application is a continuation of International Patent Application No. PCT/CN2018/113834, filed on Nov. 2, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring efficient signaling mechanisms for resource association and identification.

SUMMARY

This document relates to methods, systems, and devices for group-specific resource indications in mobile communication technology, including 5th Generation (5G) and New Radio (NR) communication systems.

In one exemplary aspect, a wireless communication method is disclosed. The method includes determining, by a network node, an association among one set of one or more reference signals (RSs) and one or more groups, where each of the one or more RSs is associated with a usage or a time-domain behavior, and transmitting, to the terminal, a signaling message comprising the association.

In another exemplary aspect, a wireless communication method is disclosed. The method includes receiving, from a network node, a signaling message comprising an association between one set of one or more reference signals (RSs) and one or more groups, where each of the one or more RSs is associated with a usage or a time-domain behavior, and transmitting, by the terminal and based on the association, the one or more RSs.

In yet another exemplary aspect, a wireless communication method is disclosed. The method includes determining that a target uplink resource is associated with a reference resource, and performing, using the target uplink resource, a transmission.

In yet another exemplary aspect, a wireless communication method is disclosed. The method includes receiving, from a network node, a message comprising a reference signal (RS) configuration, wherein one or more target RS s are associated with a spatial granularity, and transmitting, by the terminal and based on the RS configuration, the one or more RSs.

In yet another exemplary aspect, a wireless communication method is disclosed. The method includes determining, by the network node, a reference signal (RS) configuration, wherein the RS configuration comprises an association between one or more target RSs and a spatial granularity, and transmitting, to a terminal, a message comprising the RS configuration.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

As the use of wide and ultra-wide spectrum resources increase, the considerable propagation loss induced by the extremely high frequency becomes a noticeable challenge. To mitigate this issue, antenna array and beam-forming training technologies using massive MIMO, e.g., up to 1024 antenna element for one node, have been adopted to achieve beam alignment and obtain sufficiently high antenna gain. To ensure a low implementation cost while still benefiting from the advantages provided by an antenna array, analog phase shifters have become very attractive for implementing mmWave beam-forming, wherein the number of phases is finite and constant modulus constraints are placed on the antenna elements. Given the pre-specified beam patterns, variable-phase-shift-based beamforming training attempts to identify the best pattern for subsequent data transmission, e.g., in the one transmission point (TRP) and one-panel cases.

Figure 1:
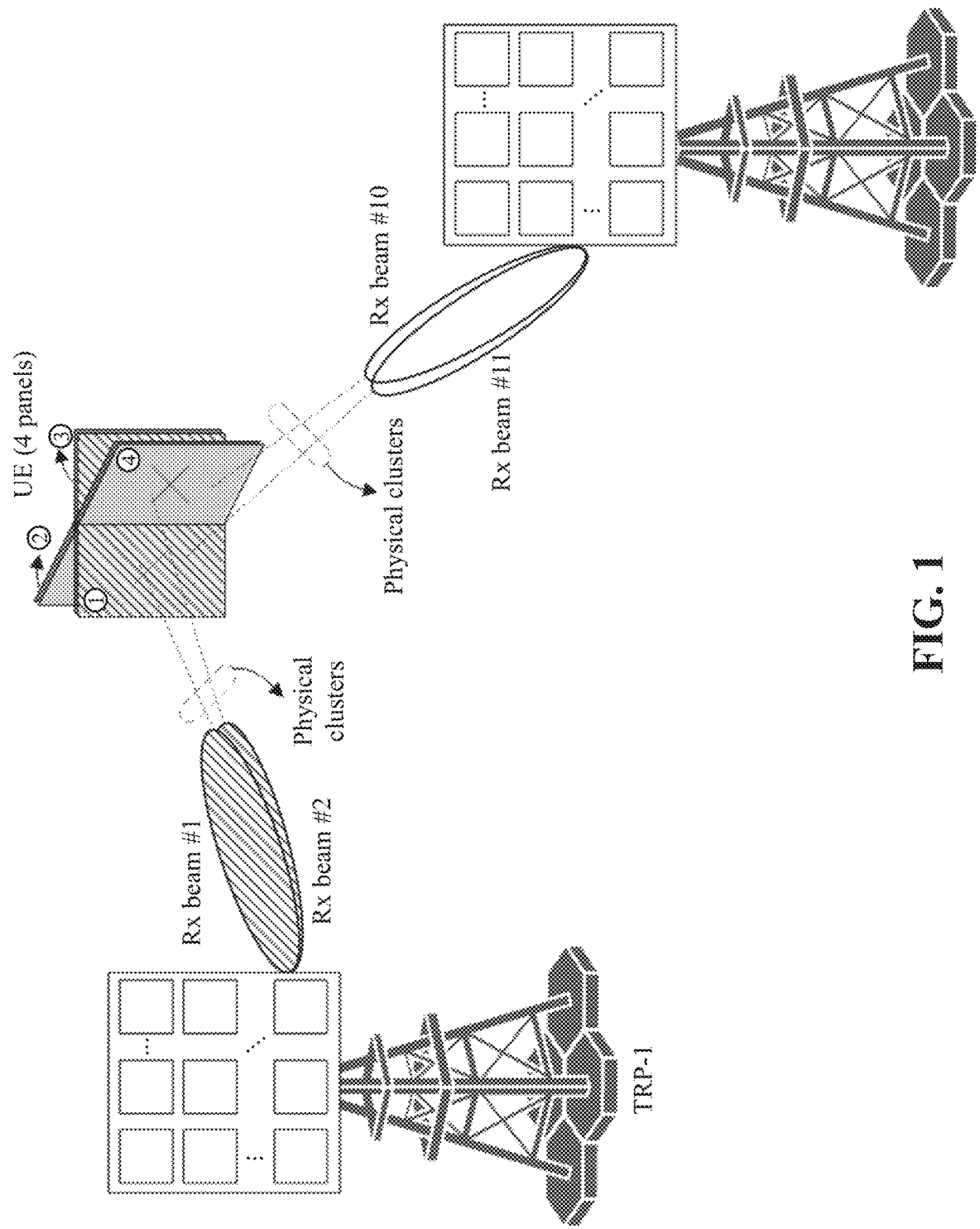
FIG. 1 shows an example of a base station (BS) and user equipment (UE) in wireless communication, in accordance with some embodiments of the presently disclosed technology.

Multi-TRP and multi-panel cases should be considered for beyond 5G gNB (base station) and the next-generation communications, wherein there are multiple panels for UE in order to cover whole space for enhancing coverage. In an example, one panel for a TRP and UE may have two TXRUs, which are associated with cross polarization. Thus, in order to achieve a high rank or multi-layer transmissions, the TRP and UE should try to use different beams generated from different panels with objective of sufficiently using capability of each panel, including its associated TXRUs. FIG. 1 shows an example of beam measurement and reporting wherein the UE has four side panels, e.g. (Mg, Ng)=(1, 4); $\Theta mg,ng$=90; $\Omega 0,1$=$\Omega 0,0$+90; $\Omega 0,2$=$\Omega 0,0$+180; $\Omega 0,3$=$\Omega 0,0$+270; (dgH, dgV)=(0,0).

Furthermore, in 5G NR, analog beam-forming was primarily introduced into mobile communication for guaranteeing the robustness of high frequency communications. For uplink (UL) transmissions, spatial relation information (e.g., a higher layer parameter denoted spatialRelationInfo) has been introduced for supporting beam indication for UL control channel, e.g., physical uplink control channel (PUCCH), and sounding reference signal (SRS). Beam indication for an UL data channel, e.g., physical uplink shared channel (PUSCH), is achieved through mapping between one or more SRS resources, which are indicated by a gNB (or base station, or network node), and ports of the data channel. This implies that the beam configuration for UL data channel may be derived from the spatial relation information associated with the SRS resources or ports, accordingly.

Consequently, in order to support multi-beam operation for UL, more than one SRS resources and UE (or terminal) panel ID associated with the more than one SRS resources should be used for UL transmission.

Figure 2:
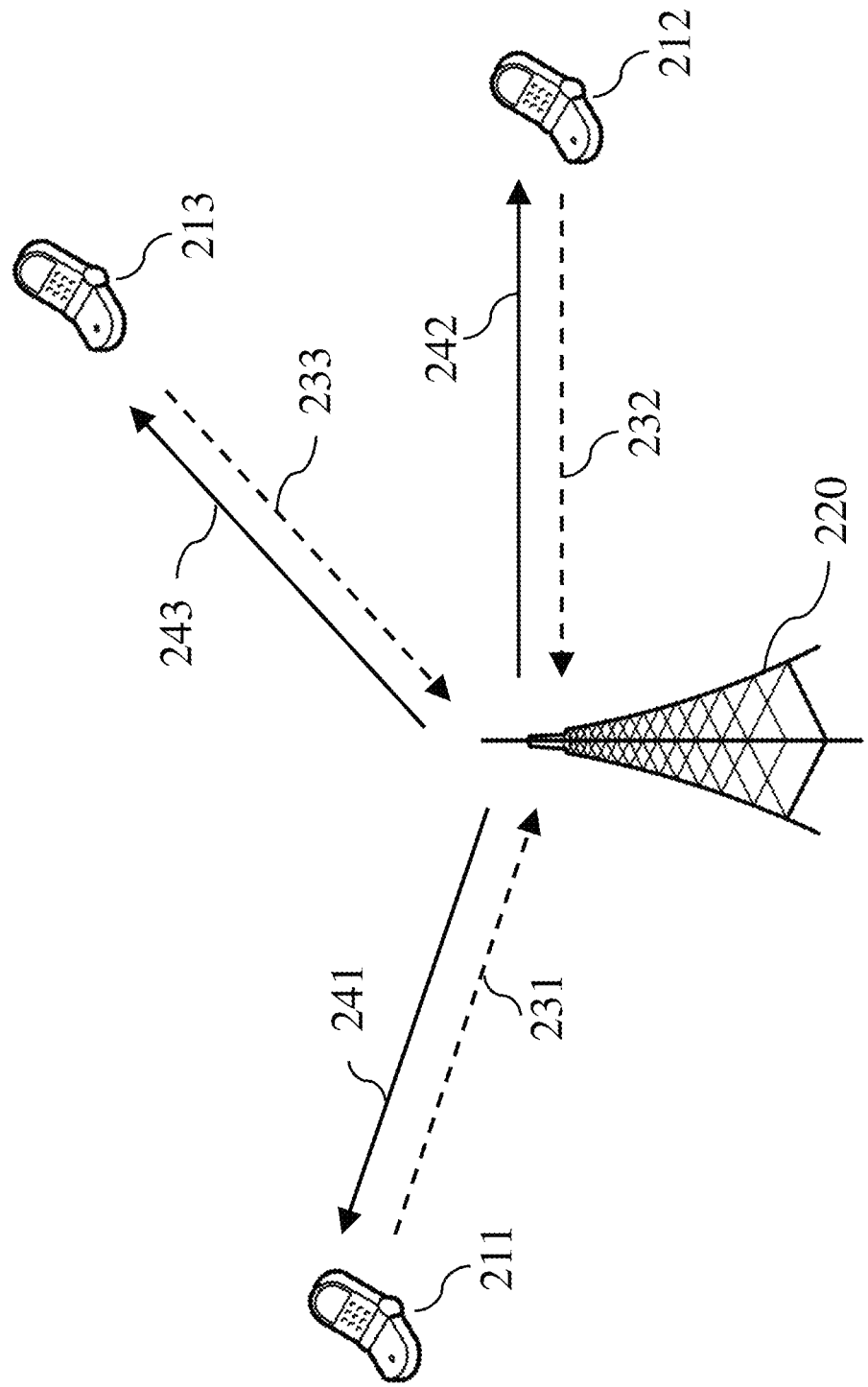
FIG. 2 shows an example of beam measurement and reporting.

FIG. 2 shows an example of a wireless communication system (e.g., an LTE, 5G or New Radio (NR) cellular network) that includes a BS 220 and one or more user equipment (UE) 211, 212 and 213. In some embodiments, the BS 220 transmits an indication of a mapping (241, 242, 243) to the UEs, which is followed by subsequent communications (231, 232, 233) that use the specified associations. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Drawbacks of Existing Implementations

Existing systems suffer from the following drawbacks:

1) In some existing implementations, there is no additional information that can provide an indication about UE panels (other than the one higher layer parameter spatialRelationInfo, which can be used for UL beam indication for SRS or UL control channel transmission. Taking into account the restrictions introduced by multiple panels, indicating the combining of multiple UL beams may NOT be allowed. For example, the different resources associated with different UE panels can be transmitted simultaneously, but the different resources associated with same UE panel can NOT be transmitted simultaneously.

2) In some existing implementations, for SRS transmissions for UL beam management, a UE may only support full spatial-domain sweeping or provide an indication for one exact beam that is the same as the reference beam. But the UE may not support performing UL beam refinement around (across) one reference beam, e.g., represented by CSI-RS or SRS which have been measured or transmitted, indicated by gNB. This UL beam refinement may be crucial for scenarios involving UE mobility or saving the overhead of UL beam training.

3) In some existing implementations, when simultaneously indicating multiple beams for one UL data transmission, the DCI overhead may be very high. For instance, there may be 4 SRS resource sets and 32 resources per set (e.g., 4 UE panels, each of which can generate up to 32 beams), which would require 4*7 bits=28 bits for 4-layer transmission.

4) In some existing implementations, when deactivating one UE panel, e.g., one group, for UL transmissions, some candidates for downlink control information (DCI) codepoints for UL transmission may be out of date. Therefore, some parts of the DCI codepoints for resource indication for UL transmission may not be necessary in such a case, and some essential DCI bits are useless.

Nomenclature for Embodiments of the Disclosed Technology

In the drawings, the descriptions, and the claims of this document the following terminology is adopted. In some embodiments, a "beam" may be interpreted as a reference signal (RS), a spatial filter or a precoding matrix. For example, A "Tx beam" may be a DL/UL reference signal (such as a channel state information reference signal (CSI-RS), synchronization signal block (SSB) (which is also called as SS/PBCH), demodulation reference signal (DMRS), sounding reference signal (SRS)), a Tx spatial filter or a Tx precoding matrix.

An "Rx beam" may be a spatial filter, an Rx spatial filter or Rx precoding.

A "beam ID" may be interpreted as a reference signaling index, a spatial filter index or a precoding index.

In some embodiments, the spatial filter may be either a UE-side filter or a gNB-side filter, and may also be referred to as a spatial-domain filter.

In some embodiments, "spatial relation information" is comprised of one or more reference RSs, which is used to represent "spatial relation" between targeted "RS or channel" and the one or more reference RSs, where "spatial relation" means the same beam, same spatial parameter, or the same spatial domain filter.

In some embodiments, a "quasi-colocation (QCL) state" may include one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] spatial parameter.

In some embodiments, the RS grouping operation may be performed according to the grouping criteria of "beam grouping" or "antenna group".

In some embodiments, "group ID" is equivalent to "resource set ID", "panel ID", "sub-array ID", "antenna group ID" or "beam group ID".

In some embodiments, a "beam group" may be interpreted as different Tx beams within one group being simultaneously received or transmitted, but Tx beams between different groups NOT being simultaneously received or transmitted.

In some embodiments, an "antenna group" may be interpreted as different Tx beams within one group NOT being simultaneously received or transmitted, but Tx beams between different groups being simultaneously received or transmitted. Furthermore, an "antenna group" may refer to up to N different Tx beams within one group being simultaneously received or transmitted, where N is positive integer, but Tx beams between different groups NOT being simultaneously received or transmitted.

Embodiments for Group-Specific Resource Configuration for UL Beam Management and Transmission In order to achieve UL beam measurement and subsequent transmission for control and data channels, SRS resource configuration for a general case, e.g., multiple panels for one UE, should be performed. Herein, the panel dedicated information may be distinguished through a different resource set or setting, e.g., a group-specific approach.

Case 1. In some embodiments, the SRS resource set can be associated with one UE panel. From the UE perspective, in the multi-panel case, $0 \sim N_{Panel}-1$ resource sets containing one or more SRS resources are configured such that each set corresponds to one panel, e.g., the SRS resources within the set are generated from its associated panel. In an example, only one SRS resource from one set can be transmitted simultaneously, and/or different SRS resources from different sets can be transmitted simultaneously. Furthermore, this case can be used for SRS with a usage that includes beam management or codebook based transmission.

Case 2. In some embodiments, each of the SRS resources or each subset of the SRS resources within one SRS resource set can be associated with one UE panel, thereby enabling multiple sets of SRS resources to be configured. In an example, the SRS resources from one set can be transmitted simultaneously, but different SRS resources from different sets can NOT be transmitted simultaneously. In another example, up to X SRS resources from one set can be transmitted simultaneously, and/or different SRS resources from different sets can NOT be transmitted simultaneously, where X is a positive integer. Furthermore, the subset of SRS resources can be derived from one SRS resources; e.g., one subset of the respective X SRS resources, in an ordered manner, is associated with the UE panel. Furthermore, this case can be used for SRS with a usage that includes non-codebook based transmission or antenna switching.

In some embodiments, the maximum number of SRS resource sets, the maximum number of SRS resources per set, and the maximum number of SRS resources to be transmitted simultaneously may depend on UE capabilities.

Figure 3:
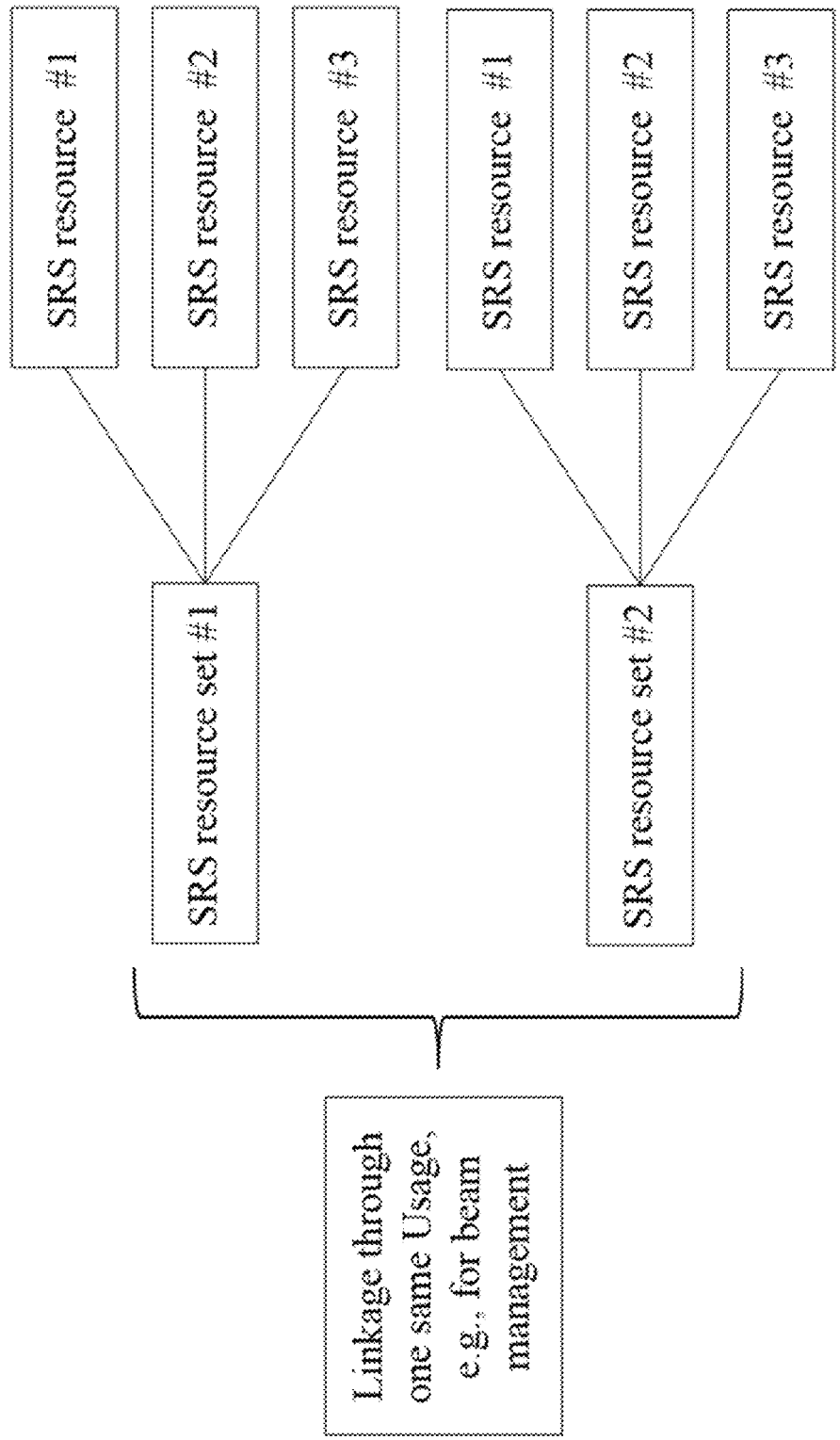
FIG. 3 shows an example of resource configuration for uplink (UL) multi-panel operations for sounding reference signal (SRS) resources.

One exemplary framework wherein multiple SRS resources are linked through an identical usage is shown in FIG. 3. As shown therein, the multiple SRS resource sets with the same usage should be considered together, based on the corresponding grouping criteria. Furthermore, the linkage can be enhanced according to time-domain behavior level, e.g. periodic (P), semi-persistent (SP) and aperiodic (AP). In this case, multiple SRS resource sets with the same usage mode and/or same time-domain behavior should be considered together for one grouping criteria.

Figure 4:
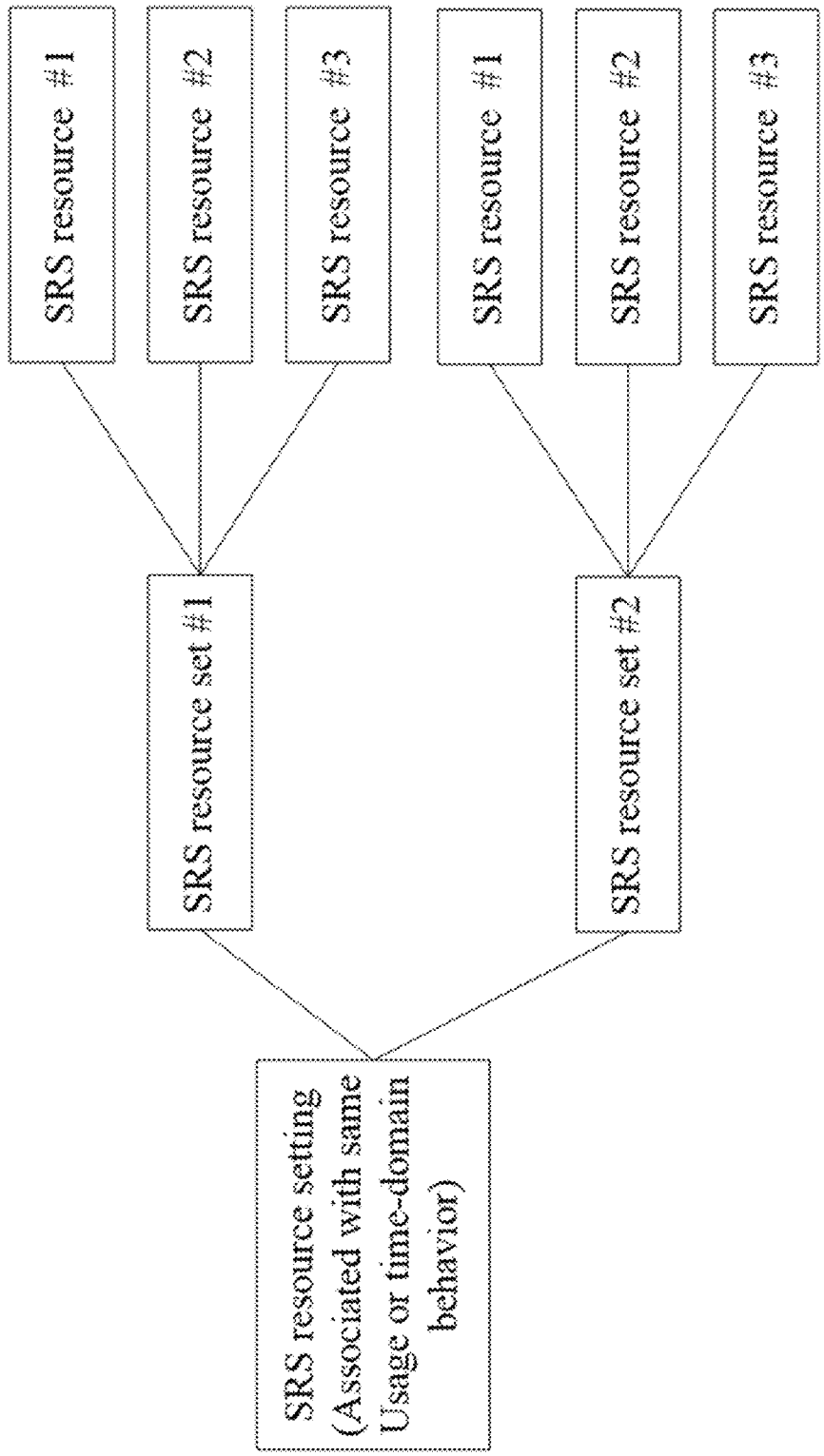
FIG. 4 shows another example of resource configuration for UL multi-panel operations for sounding reference signal (SRS) resources.

Another exemplary framework where multiple SRS resources are linked through one SRS resource setting is shown in FIG. 4. Herein, the grouping criteria or time-domain behavior can be associated with an SRS resource setting level. The grouping criteria is only applied for the SRS resource set within the one SRS resource setting, and all SRS resources within one setting should have the same time-domain behavior.

Embodiments for Group-Specific Resource Indication for UL Transmission

Figure 5:
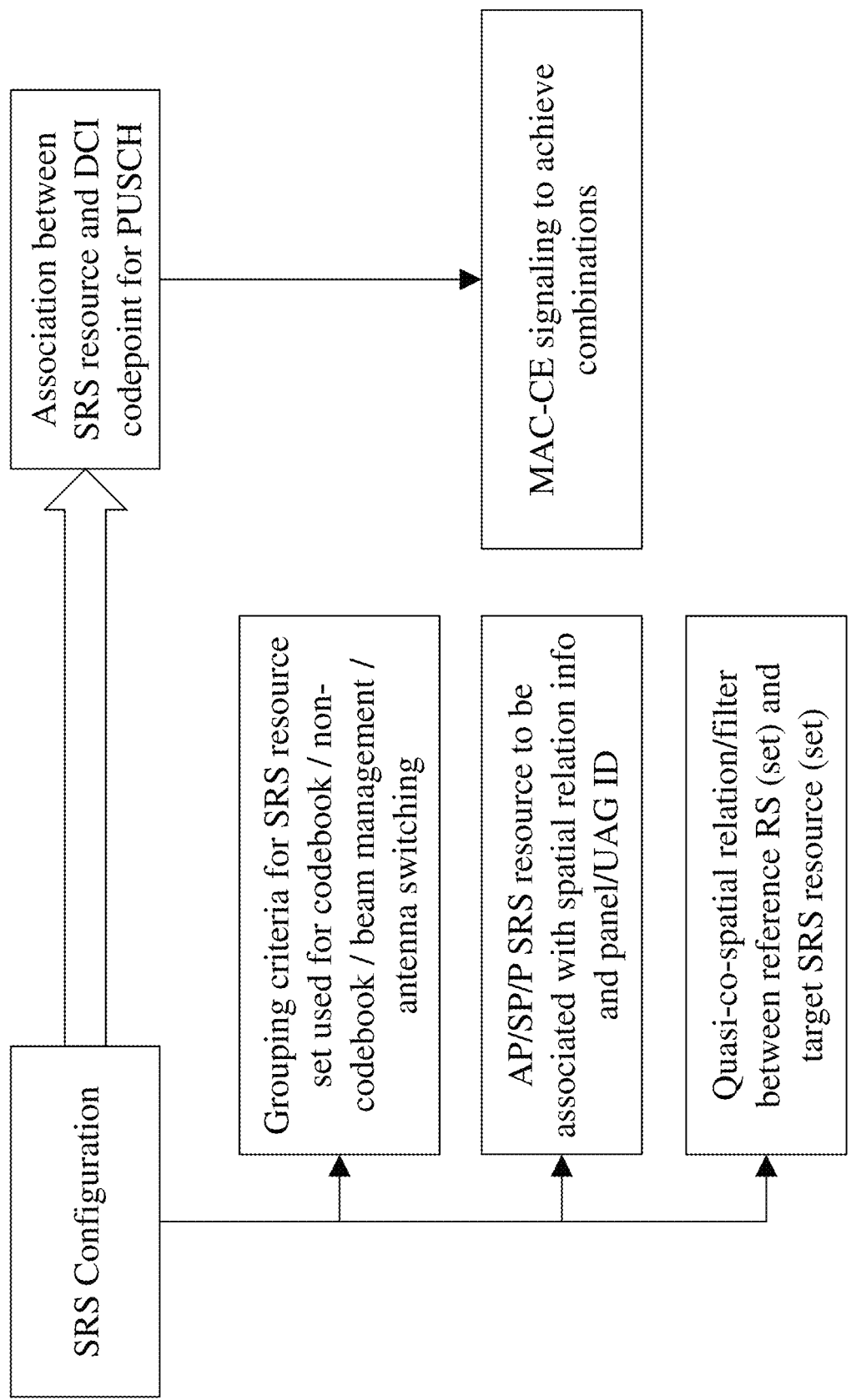
FIG. 5 shows an exemplary framework for group-specific resource indication for uplink transmissions.

The framework for group-specific resource indication for UL is shown in FIG. 5. As shown therein, the SRS configuration is related to the following three cases:

Case 1. In some embodiments, grouping criteria and the corresponding resource configuration for SRS resource set are used for codebook-based transmission, non-codebook based transmission, beam management and/or antenna switching, and as described in the previous section of this document.

Case 2. In some embodiments, the AP/SP/P SRS resource is to be associated with spatial relation info and group ID. In an example, and for codebook-based or non-codebook based transmission, the group ID associated with an SRS should be selected from activated group pools (e.g., in the case of SP/AP-SRS).

1) sp-SRS configuration. Using the MAC-CE, a group ID provided by group-based reporting or SRS resource set can be associated with spatial relation info. For example, using the RRC for the group ID pool, and using the RRC for the spatial info relation pool for each sp-SRS resource per set.

2) p-SRS configuration. One SRS resource is associated with group ID in RRC level, respectively. Alternatively, the group-ID is contained in spatial relation info. Alternatively, group-ID is contained outside spatial relation info: e.g., per SRS resource set.

3) ap-SRS configuration. Associating among spatial relation, group-ID and resource ID, and where the following two exemplary solutions may be used:

Solution 1. Use one ap-SRS triggering state, wherein (a) one trigger-state has been associated with group-ID for one set, e.g., for codebook based transmission, or (b) each SRS resource associated with the one trigger-state has been associated with group-ID, e.g., for non-codebook based transmission.

Solution 2. Use RRC for associating between ap-SRS resource and group ID, where group-ID is contained in spatial relation info, or group-ID is contained outside spatial relation info, e.g., per SRS resource set.

Case 3. In some embodiments, establish a quasi-co-spatial relation (QcSR) association between reference RS resource (set) and target RS resource (set) or channel. A QcSR requires that a UE should transmit the target RS resource (set) or channel with the similar angular of Tx beam or similar correlation of spatial domain as the reference RS (set).

The reference RS can be DL RS, like CSI-RS or SSB, or UL RS, like SRS.

The degree of similarity can be specified through one pre-define threshold for angular difference or spatial correlation.

QcSR can be also called as quasi-co-spatial-filter/quasi-co-filter, quasi-co-beam or quasi-correlation.

In some embodiments, and when the SRS is used for codebook or non-code transmission, in order to saving DCI overhead and keep the flexibility of beam indication, the mapping of combining information between multiple SRS resources and only one codepoint in DCI should be considered.

In some embodiments, and taking into account the coupling between an SRS resource and UL data channel, the current beam indication for SRS (e.g., for aperiodic and periodic time behaviors) is only at the RRC level, and is not dynamic. The combining signaling can be achieved by introducing a new MAC-CE signal. Two exemplary solutions may be used:

Solution 1. Up to X {group ID+Spatial relation info for PUSCH} through one MAC-CE are to be associated with one codepoint in SRI DCI field, and wherein the spatial relation info for PUSCH can contain any types of ap, sp or p-SRS for PUSCH transmission.

Solution 2. Combining of up to X {SRS resource ID+SRS resource set ID}, which have the same time-domain behavior, for each of codepoint in DCI. For example, the PUSCH transmission is determined according to the latest SRS transmission of the indicated {SRS resource ID+SRS resource set ID} prior to the DCI scheduling PUSCH.

In some embodiments, the approach to provide the candidates for combinations of SRS resources by MAC-CE signaling should meet the UE capability of simultaneous transmission or the previous grouping information for the SRS resources.

In some embodiments, and when one UE panel is deactivated, the DCI codepoint associated with the UE panel should be assumed as out-of-date, e.g., ignored by UE side, and the length of DCI field after panel deactivating should be reduced accordingly.

In some embodiments, one UL/DL reference RS is associated with K1 groups, and one UL target RS is associated with the UL/DL RS with respect to K2 groups, where the K2 groups are a subset of the K1 groups, where the indexes of K2 groups are provided for the association, and where K1≥K2≥1. Furthermore, the case that there is only one to one mapping, e.g., K1=K2, is also included as one special case. The UL target RS is transmitted using the spatial filters corresponding to the spatial filters in the K2 groups used for reception of the DL reference RS or transmission of the UL reference RS.

In some embodiments, the indexes of the K2 groups can be provided by RRC, MAC-CE or DCI signaling. In other embodiments, the one UL target RS is associated with the UL/DL RS by RRC, and subsequently using MAC-CE or DCI signaling is to activate the K2 groups as one subgroup from the K1 groups for transmission of the target RS.

Embodiments for Semi-Periodic-SRS Group-Specific Configurations

In some embodiments, MAC-CE signaling for activating sp-SRS is used for associating sp-SRS with group ID, e.g., panel, beam group or antenna group ID, besides spatial relation info. The condition of configuring group ID or whether the group ID is present or not are determined according to the following cases:

Case 1, which is based on the usage of the contained SRS. In an example, for beam management or codebook transmission, only one group ID is configured for one SRS set, or the group ID associated with each of SRS resource within one set is the same. In another example, for non-codebook transmission or antenna switching, a group ID is configured per SRS resource within one set.

Case 2, which is based on the type of reference RS. In an example, if the reference RS is SRS, only spatial relation info is proposed, due to the fact that, for the SRS, UE can derive the group ID from the reference SRS, which has been configured. In another example, if the reference RS is DL RS, e.g., SSB or CSI-RS, the group ID should be provided explicitly.

Case 3, which is based on UE capability. In an example, and in the context of antenna switching, the number of Rx panels to be associated with one TX panel, the number of Tx ports per Rx port, or the number of Rx antenna ports to be associated with one Tx antenna ports are UE capability, besides the total number of Tx and Rx antenna ports. For instance, if more than one Tx port is associated with one Rx port in one antenna group, a group ID (as well as spatial relation) can be configured per SRS port of each SRS resource within one set.

In some embodiments, the panel or group ID in the MAC-CE signaling is selected from one RRC pool, entries of which are determined according to UE capability signaling, e.g., the number of panel, sub-array, or antenna groups. Furthermore, the group ID is selected from the pool of group IDs activated by MAC-CE signaling, which is down-selected from the RRC pool. In addition, the panel or group associated with their ID in the MAC-CE signaling should be activated one.

Embodiments for Periodic-SRS and Aperiodic-SRS Group-Specific Configurations

In some embodiments, one p-SRS or ap-SRS resource may be associated with one group ID at the RRC level, respectively. For example, there may be support for:
1) a panel/group ID contained in spatial relation info;
2) a panel/group ID contained per resource; or
3) a panel/group ID contained per SRS resource set.

In some embodiments, and for ap-SRS, up to N ap-SRS triggering state is configured by higher layer parameter, and then MAC-CE signaling is used for down-selecting M states, which is associated with each codepoint in DCI. Furthermore, the configuration for the ap-SRS triggering state is determined according to the usage of ap-SRS, the type of reference RS or UE capability signal, e.g.

One trigger-state has been associated with group-ID for one set, e.g., SRS for codebook transmission or for beam management. Alternatively, a list of group ID contained in trigger state should be the same if they are configured for SRS for codebook transmission or beam management.

One trigger-state is associated with one list of group ID, each entry of which is associated with SRS resource within one set in order, which is associated with the trigger state, e.g., SRS for non-codebook transmission or for antenna switching.

Embodiments for Quasi-Co-Spatial Relation (QcSR) Associations Between a Reference RS (Set) and a Target SRS Resource (Set)

In some embodiments, when a target UL RS or channel is associated with a reference RS in terms of spatial relation, the target RS should be transmitted by the same spatial domain filter used for reference RS, irrespective that the reference RS is the uplink or downlink one. In order to achieve UL beam tracking, one target RS or channel can be QcSR associated with one or more reference RSs, which means that the beam used for the target RS or channel are very similar to those used for reference RSs.

In some embodiments, the QcSR association can be defined that, two antenna ports or RSs are said to be QcSR if the properties of the channel over which a symbol on one antenna port or RS is conveyed can be inferred from the channel over which a symbol on the other antenna port or RS is conveyed. In other words, the inference may be based on the correlation between the property on the two channels. For example, the property may be a spatial parameter, an angular difference, a spatial correlation, or a precoding correlation.

In some embodiments, two antennas ports or RSs are said to be QcSR if the angular difference between boresight of spatial domain filter of one antenna port or RS and the other antenna port or RS is less than or equal to one threshold.

In some embodiments, two antennas ports or RSs are said to be QcSR if the spatial correlation between spatial domain filter or pre-coding of one antenna port or RS and the other antenna port or RS is higher than or equal to one threshold.

In an example, one new SRS resource as a target RS is configured with one reference RS, e.g., one SRS resource, in terms of QcSR, which implies that the spatial domain filter of the new SRS resource may be determined according to the reference RS, and the UE does not need to use the exact same spatial relation filter as the reference RS. Furthermore, one new SRS resource set can be configured with one reference RS, e.g., DL or UL RS, in terms of QcSR. In such a case, UE can generate the multiple spatial domain filters associated respective SRS resources around that associated the reference RS.

Figure 6:
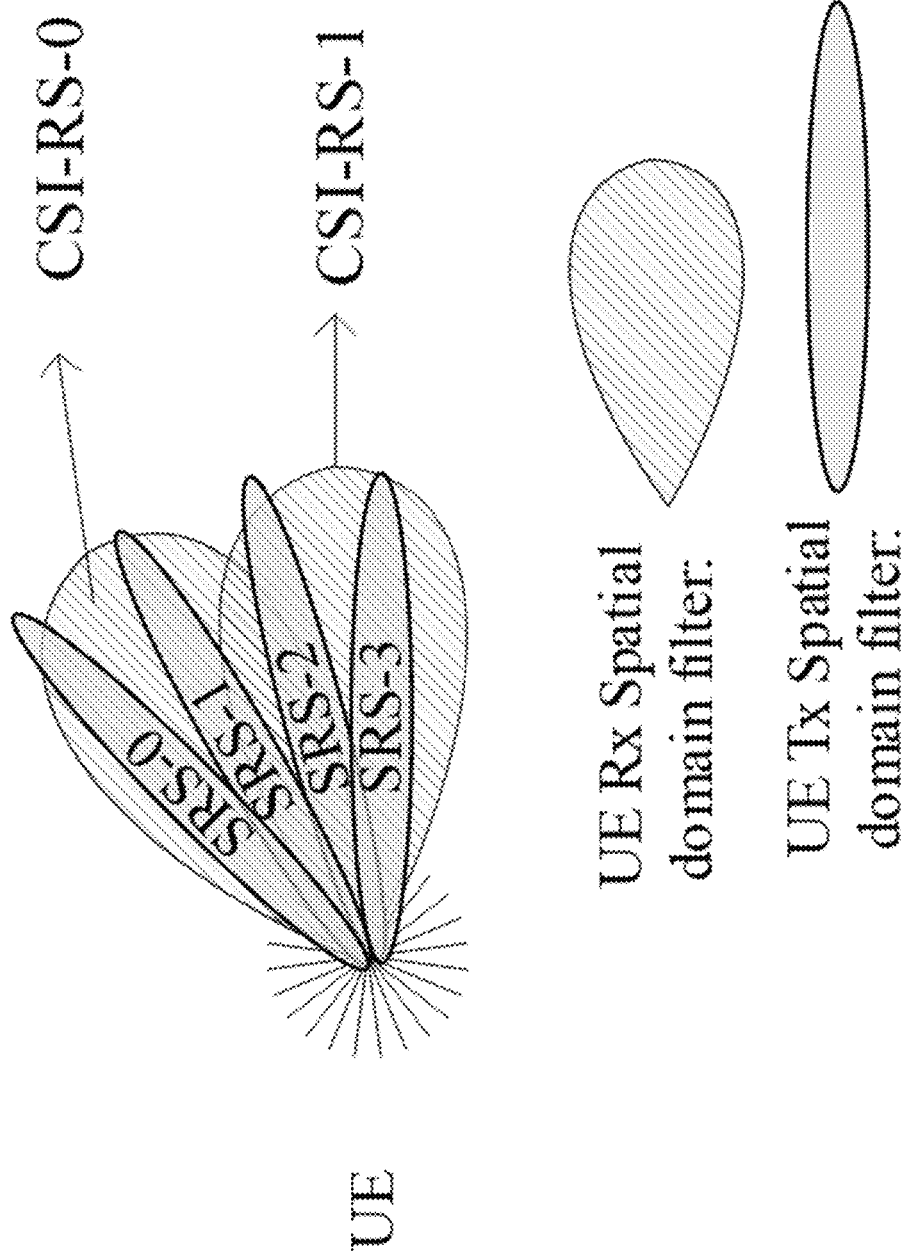
FIG. 6 shows an example of a quasi-co-spatial relation (QcSR) between one CSI-RS set and one SRS resource set.

In another example, one SRS resource set containing N, e.g., N=4, resources have resource-wise QcSR properties with one CSI-RS resource set containing M, e.g., M=2, resource as shown in FIG. 6. Furthermore, N=MK and N, M and K are positive integers, where one resource of the CSI-RS set and respective K resources of the SRS set, in an ordered manner, meets the requirement of the QcSR property.

In some embodiments, a target RS can be associated with information about spatial granularity, which is equivalent to the level of beam-forming gain, antenna gain, beam pattern, beam-width or number of beams with the same or similar beam-width or beam pattern.

In an example, a UE supports 3 level of spatial granularity: a first level with one beam with a beam-width of 60 degrees, a second level with one beam with a beam-width of 30 degrees, and a third level with one beam with a beam-width of 15 degrees. For initial beam management and coarse beam searching, a gNB may configure some RSs with the first granularity level, which can accelerate the progress of beam sweeping but with low accuracy. After determining one Tx and Rx beam pair with the first level granularity, the gNB can configure some other RSs with second level granularity for beam refinement, and which are associated with the searched Tx and Rx beam pair with the first level of granularity. Through this association with searched the beam pair (at the first granularity level), some unnecessary beam sweeping, like whole-space beam sweeping, under the second level granularity, e.g., some narrower beams, can be avoided. After the second beam training, a subsequent narrower and better antenna gain beam pair, which points to each other, may be found accordingly. Similarly, gNB can configure some other RSs with third level granularity for further beam refinement over those with second level granularity.

In some embodiments, the spatial granularity may be determined by the capability of the UE, which can report its spatial granularity, when required. In an example, the spatial granularity may be one of the following: a number or a maximum number of spatial granularity levels, a maximum number of resources for a first granularity level, a maximum number of resources per set for a second granularity level, or a maximum number of resource sets for a third granularity level.

Figure 7:
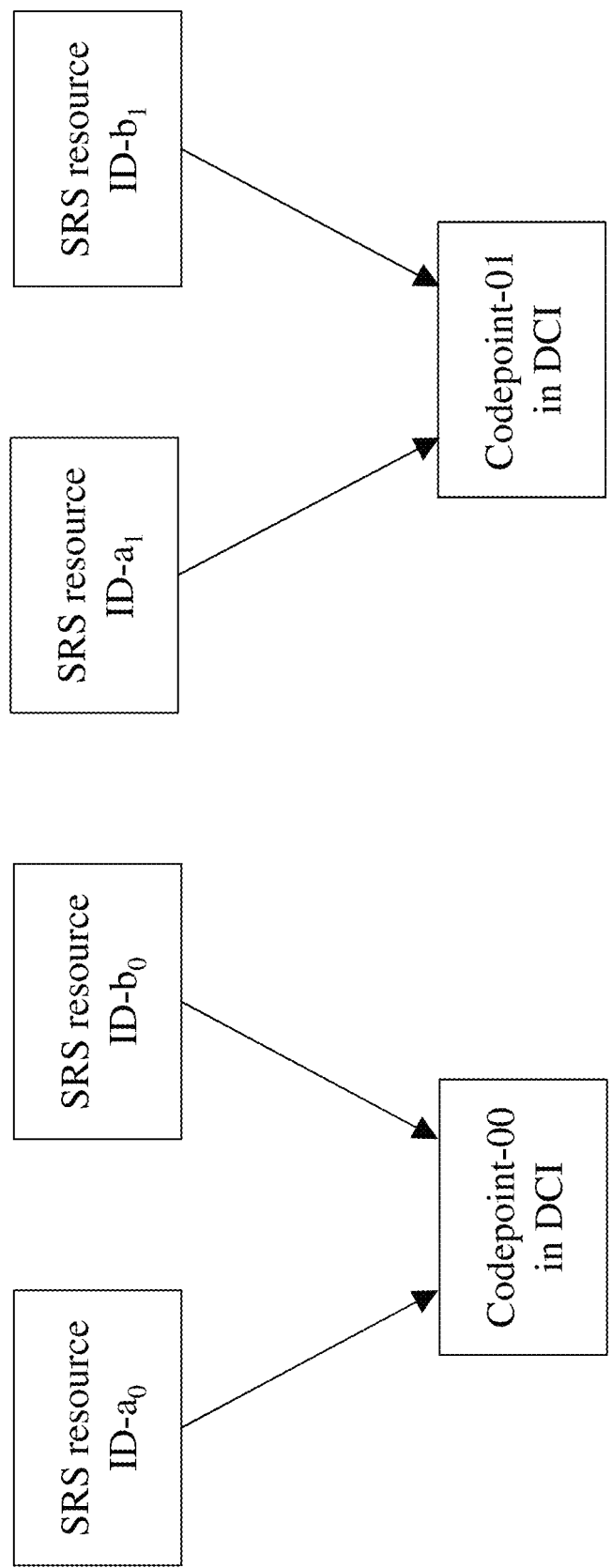
FIG. 7 shows an example of an association between one or more SRS resource IDs and one codepoint in downlink control information (DCI).

Embodiments for SRS Indication for PUSCH Transmission with Group Information Considerations In some embodiments, and to save DCI overhead in the case of sufficient flexibility, new MAC-CE signaling is introduced for the combining of one or more ap/sp/p-SRS resource IDs (and/or its associated SRS resource set ID) for one codepoint in DCI, as shown in FIG. 7.

In some embodiments, all resources associated with one codepoint or all codepoint should be kept in the same time domain behavior. In other embodiments, the indicated SRS is the latest SRS transmission of the ap/sp/p-SRS resource IDs (or its associated SRS resource set ID) prior to the DCI scheduling PUSCH. In yet other embodiments, combination by MAC-CE signaling is provided according to the capability of simultaneous transmission.

In some embodiments, when one UE panel is deactivated, the DCI codepoint associated with the UE panel should be assumed as out-of-date, e.g., ignored by UE side, and the length of DCI field after panel deactivating should be reduced accordingly.

Exemplary Methods for the Disclosed Technology

The methods and examples of the disclosed technology provided below explain general concepts, and are not meant to be interpreted as limiting. In an example, unless explicitly indicated to the contrary, the various features described in these examples may be combined.

Figure 8:
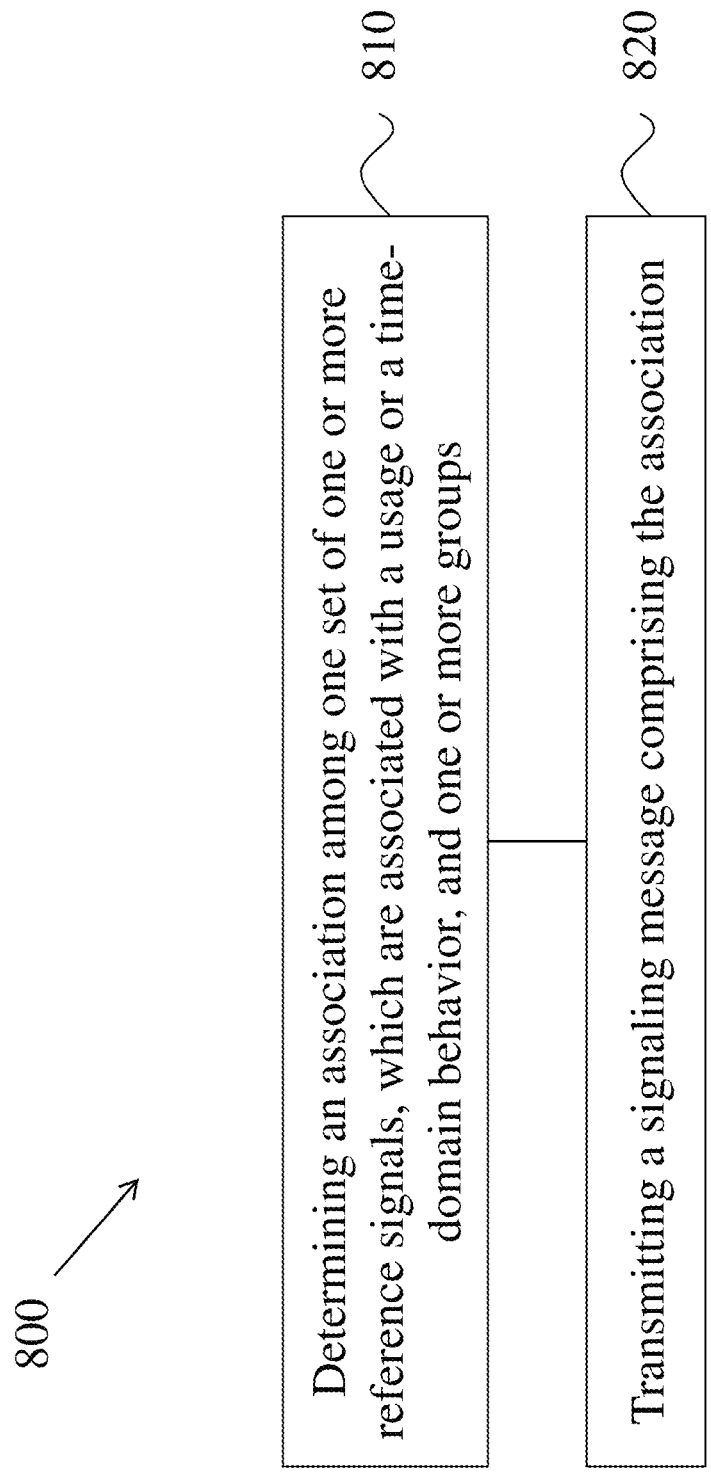
FIG. 8 shows an example of a wireless communication method, in accordance with some embodiments of the presently disclosed technology.

FIG. 8 shows an example of a wireless communication method 800 for group-specific resource indications. The method 800 includes, at step 810, determining an association among one set of one or more reference signals, which are associated with a usage or a time-domain behavior, and one or more groups. An example of the association structure, based on a usage or time-domain behavior, in shown in FIGS. 3 and 4.

The method 800 includes, at step 820, transmitting a signaling message comprising the association.

In some embodiments, one RS of the one or more RSs is associated with one or more spatial relation information, and where each of the one or more spatial relation information contains one or more reference RSs.

In some embodiments, the association between the one set of one or more RSs and the one or more groups is based on at least one of the usage of the one or more RSs, a type of one or more reference RSs, or one or more terminal capability signals. In an example, and in the case that the association between the one set of one or more RSs and the one or more groups is based on the usage of the one or more RSs, at least one of the following criteria is met:
  when the usage is beam management or the codebook-based transmission, and only one group is configured for the one set of the one or more RSs;
  when the usage is beam management or the codebook-based transmission, and the one group is configured for each RS of the one set, and each of the one or more RSs in the one set belong to a same group;
  when the usage is non-codebook based transmission, and one group is configured per RS of the one set; or when the usage is antenna switching, and one group is configured per RS of the one set or one group is configured per port or port group of one RS.

In another example, the one or more terminal capability signals includes at least one of a number of receiver panels or antenna groups to be associated with one transmitter panel or antenna group, a number of transmitter ports per receiver port, a number of receiver antenna ports to be associated with one transmitter antenna port, a total number of transmitter antenna ports, a total number of receiver antenna ports, a number of receiver panels or antenna groups, a maximum number of spatial domain filters to be transmitted simultaneously, a maximum number of spatial domain filters to be received simultaneously, or a number of transmitter panels or antenna groups.

In some embodiments, the association between the one set of one or more RSs and the one or more groups is based on the one or more reference RSs, and each of the one or more reference RSs is associated with the one or more groups. In an example, one RS of the one or more RSs is associated with at least one reference RS of the one or more the reference RSs, and the one RS and the at least one reference RS are both associated with at least one same group of the one or more groups. In another example, one RS of the one or more RSs is associated with at least one reference RS of the one or more the reference RSs, and the one RS is associated with subset of groups associated with the at least one reference RS. In another example, the indexes of the subset of groups may be communicated by radio resource control (RRC), medium access control (MAC) control element (CE) message or downlink control information (DCI).

Figure 9:
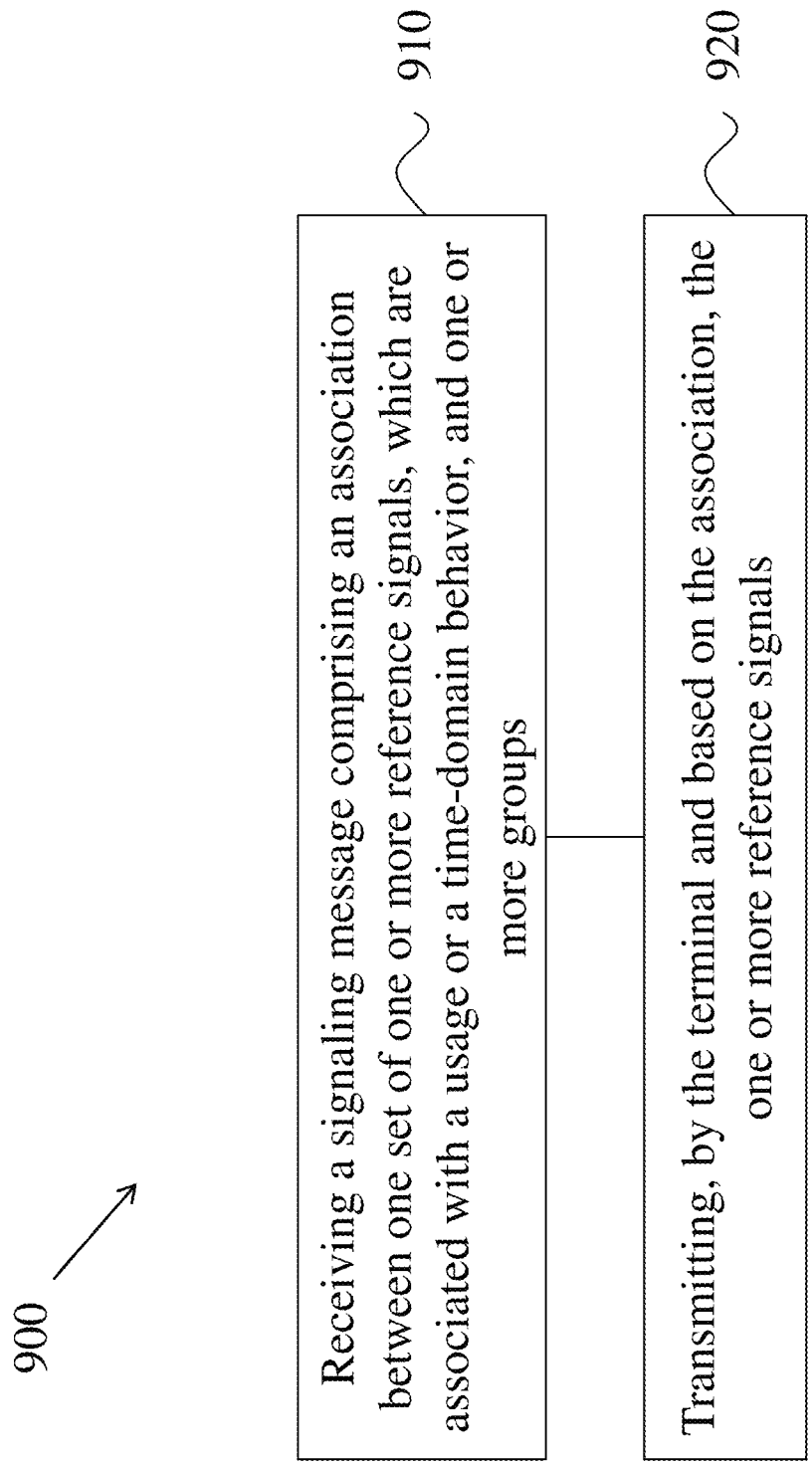
FIG. 9 shows another example of a wireless communication method, in accordance with some embodiments of the presently disclosed technology.

FIG. 9 shows an example of a wireless communication method 900 for group-specific resource indications. This example includes some features and/or components that are similar to those shown in FIG. 8, and described above. At least some of these features and/or components may not be separately described in this section.

The method 900 includes, at step 910, receiving a signaling message comprising an association between one set of one or more reference signals, which are associated with a usage or a time-domain behavior, and one or more groups.

The method 900 includes, at step 920, transmitting, by the terminal and based on the association, the one or more reference signals.

In the context of methods 800 and 900, some embodiments may be implemented in a variety of configurations. In an example, at least one of the one or more groups includes at least one of a resource, a port group, a resource set, a panel, a sub-array, a spatial filter, a spatial filter group, an antenna group or a beam group. In another example, the usage includes beam management, antenna switching, non-codebook based transmission, or codebook-based transmission. In yet other examples, a type of the time-domain behavior is periodic, semi-periodic or aperiodic. In yet other examples, one RS comprises an SRS.

In some embodiments, the one or more groups are selected from one set of groups, and wherein the one set of groups is configured by radio resource control (RRC).

In some embodiments described by methods 800 and 900, the RS and signaling message may be selected in various configurations. In an example, each RS of the one set of one or more RSs is a semi-persistent sounding reference signal (SRS), and the signaling message is a medium access control (MAC) control element (CE) message. In another example, each RS of the one set of one or more RSs is a periodic SRS, and the signaling message is a radio resource control (RRC) message. In yet another example, each RS of the one set of one or more RSs is an aperiodic SRS, and the signaling message is a radio resource control (RRC) message or a medium access control (MAC) control element (CE) message.

In yet another example, each RS of the one set of one or more RSs is an aperiodic SRS, and the association comprises at least one triggering state. In this case, the at least one triggering state may include a single triggering state that is associated with one or more SRS. Alternatively, the at least one triggering state may include a plurality of second-type triggering states, where one of the plurality of second-type triggering states is associated with one SRS.

In some embodiments described by methods 800 and 900, a medium access control (MAC) control element (CE) signaling jointly encodes identifications of the one or more RSs for one codepoint in a downlink control information (DCI), and as shown, for example, in FIG. 7. In an example, the identifications of the one or more RSs for the one codepoint are jointly encoded based on one simultaneous transmission rule or one grouping criteria for one or more sets of the one or more RSs. In another example, the usage is for the codebook-based transmission, and wherein the one or more RSs to be jointly encoded for the one codepoint is selected from different sets. In yet another example, the usage is for the non-codebook based transmission, and wherein the one or more RSs to be jointly encoded for the one codepoint is selected from a same set. In yet another example, the one or more RSs to be jointly encoded for the one codepoint or all codepoints comprise a same type of time domain behavior. In yet another example, one group of the one or more groups is deactivated, and wherein the one codepoint in the DCI associated with the one group is ignored or withdrawn. In yet another example, one group of the one or more groups is deactivated, and wherein codepoints in the DCI not associated with the one group or the codepoints in the DCI associated with activated groups are re-numbered.

Figure 10:
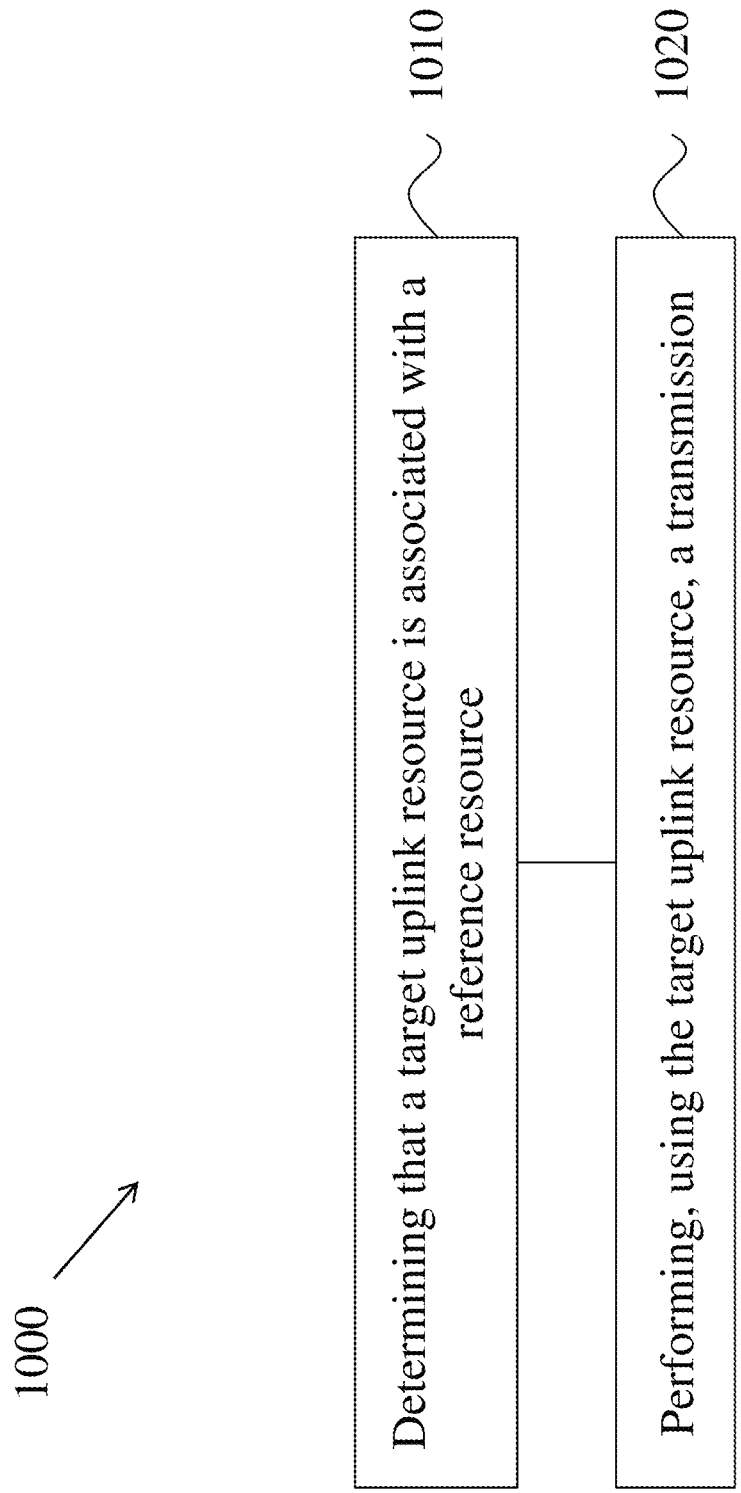
FIG. 10 shows yet another example of a wireless communication method, in accordance with some embodiments of the presently disclosed technology.

FIG. 10 shows an example of a wireless communication method 1000 for group-specific resource indications. The method 1000 includes, at step 1010, determining that a target uplink resource is associated with a reference resource.

The method 1000 includes, at step 1020, performing, using the target uplink resource, a transmission.

In some embodiments, a difference between transmission beam angles associated with the target uplink resource and the reference resource is less than or equal to a first threshold.

In some embodiments, a property of a first channel over which a symbol on the target uplink resource is communicated is correlated with the property of a second channel over which a symbol on the reference resource is communicated. In an example, the property is transmission beam angle. In another example, the property is spatial-domain correlation. In yet another example, the property is precoding correlation.

In some embodiments, a correlation between spatial domain filters or precoding metrics associated with the target uplink resource and the reference resource is greater than or equal to a first threshold.

In the method 1000, a first set of N target uplink resources may be resource-wise associated with a second set of M reference RSs, wherein N and M are positive integers. In an example, N=MK and K is a positive integer, and one resource of the second set of M reference RSs is associated, in an ordered manner, with a corresponding K resources of the first set of N target uplink resources.

Figure 11:
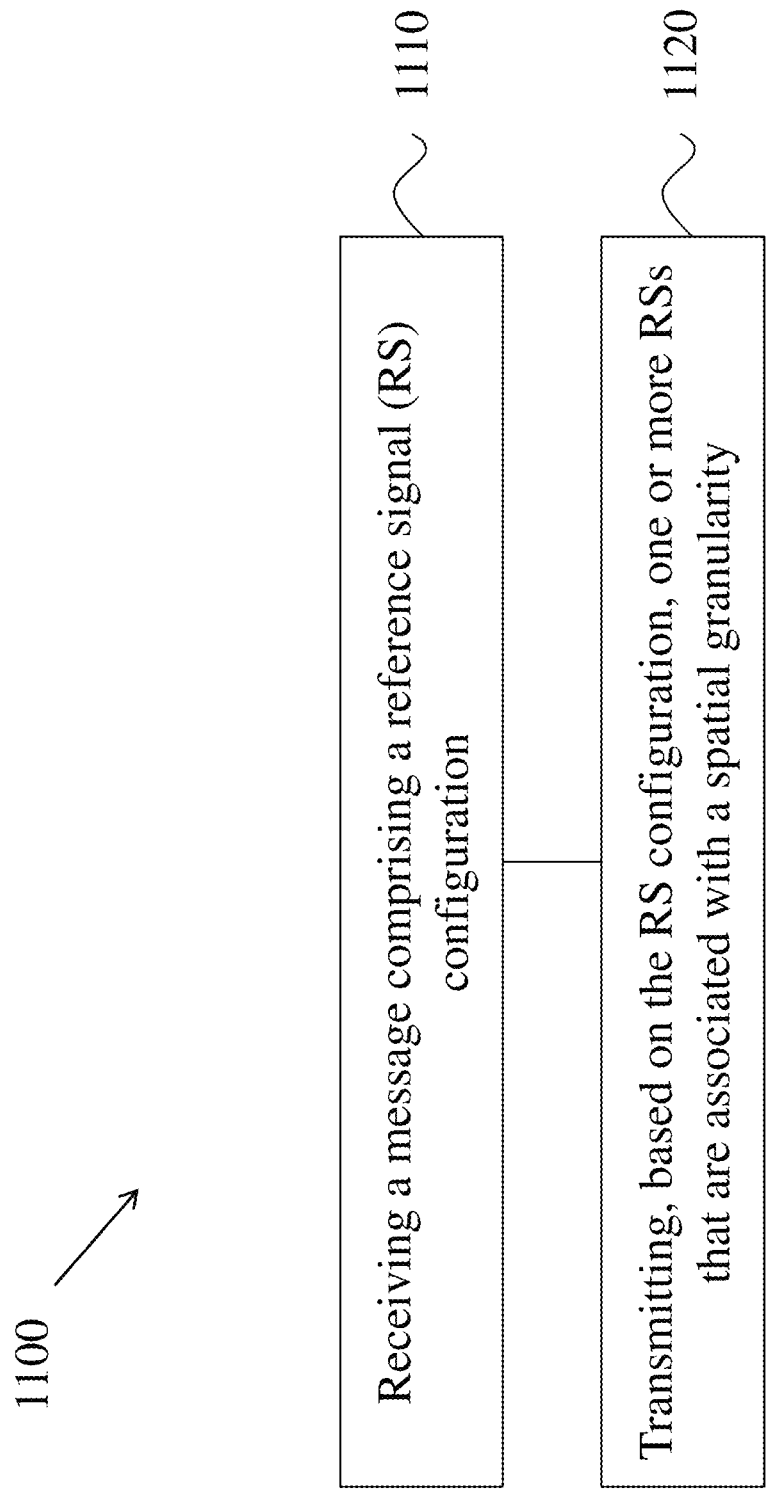
FIG. 11 shows yet another example of a wireless communication method, in accordance with some embodiments of the presently disclosed technology.

FIG. 11 shows an example of a wireless communication method 1100 for group-specific resource indications. The method 1100 includes, at step 1110, receiving a message comprising a reference signal (RS) configuration.

The method 1100 includes, at step 1120, transmitting, based on the RS configuration, one or more RSs that are associated with a spatial granularity.

Figure 12:
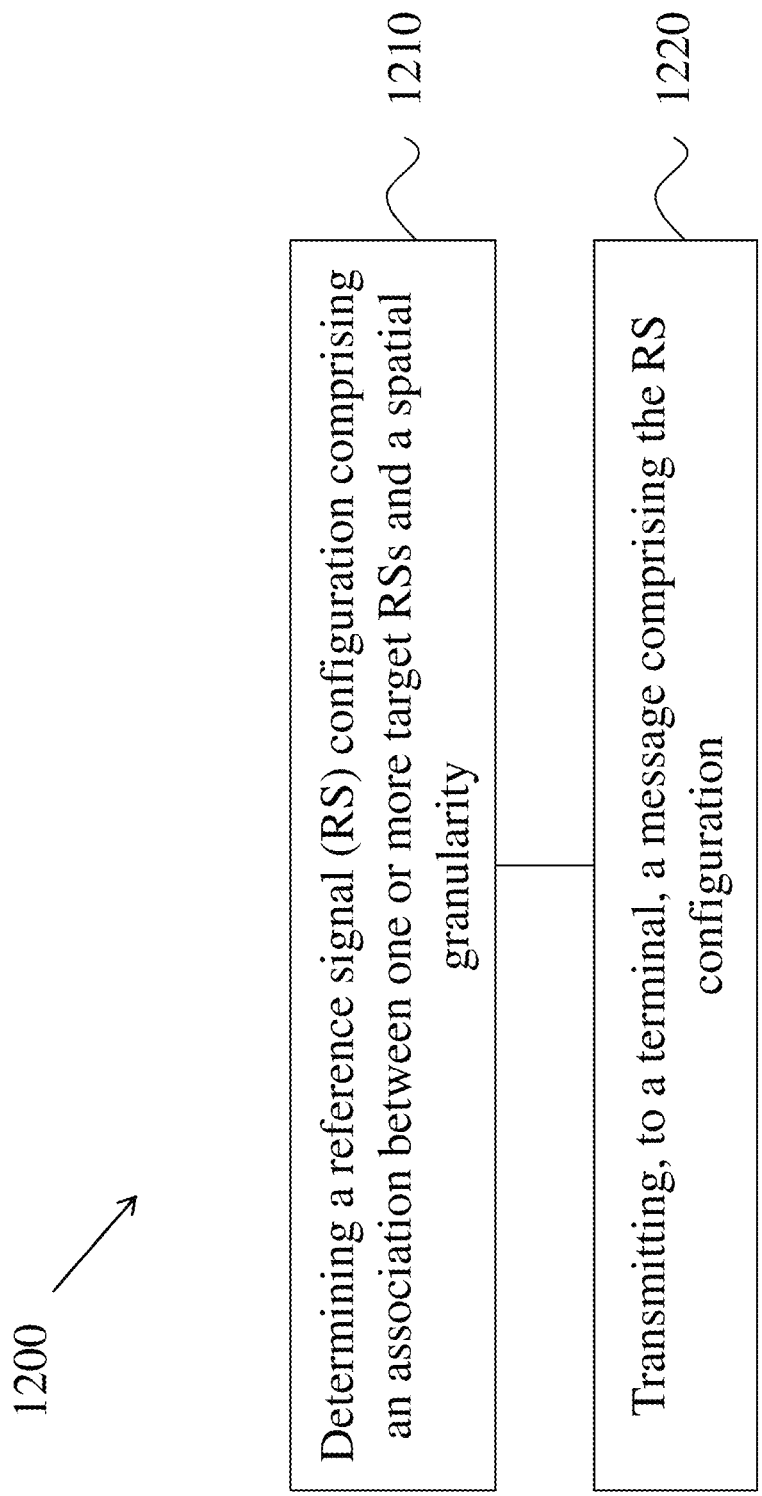
FIG. 12 shows yet another example of a wireless communication method, in accordance with some embodiments of the presently disclosed technology.

FIG. 12 shows an example of a wireless communication method 1200 for group-specific resource indications. This example includes some features and/or components that are similar to those shown in FIG. 11, and described above. At least some of these features and/or components may not be separately described in this section.

The method 1200 includes, at step 1210, determining a reference signal (RS) configuration comprising an association between one or more target RSs and a spatial granularity.

The method 1200 includes, at step 1220, transmitting, to a terminal, a message comprising the RS configuration.

In the context of methods 1100 and 1200, the spatial granularity may be a spatial granularity level, a beamforming gain, an antenna gain, a beam pattern, a reference RS, a reference RS set, a number or a maximum number of resources, a beam-width, or a transmission beam angle. And the message including the RS configuration is determined based on one or more capability signaling of spatial granularity that includes at least one of a number or a maximum number of spatial granularity levels, a maximum number of resources for a first granularity level, a maximum number of resources per set for a second granularity level, or a maximum number of resource sets for a third granularity level. In an example, a spatial domain filter of a target RS of the one or more target RSs is correlated with a spatial domain filter of the reference RS set or a spatial domain filter of one RS of the reference RS set.

Implementations for the Disclosed Technology

Figure 13:
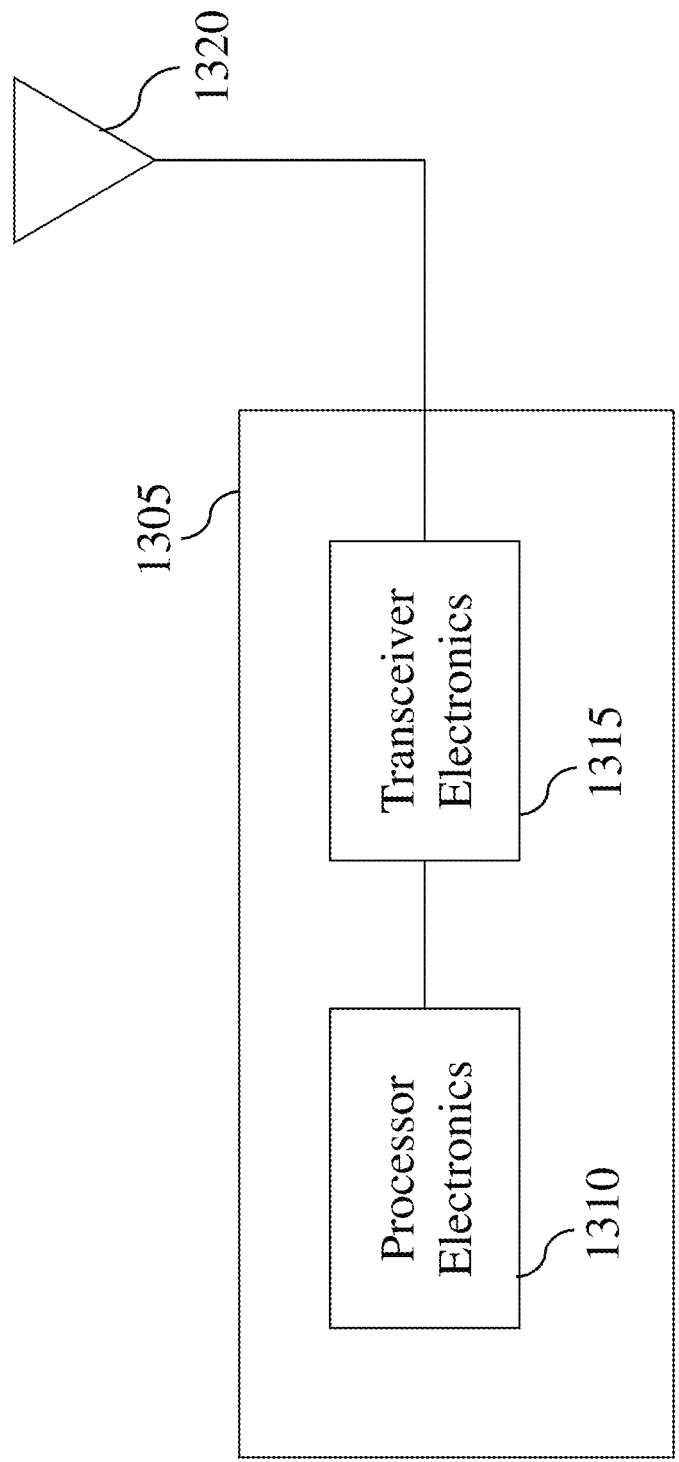
FIG. 13 is a block diagram representation of a portion of an apparatus, in accordance with some embodiments of the presently disclosed technology.

FIG. 13 is a block diagram representation of a portion of an apparatus, in accordance with some embodiments of the presently disclosed technology. An apparatus 1305, such as a base station or a wireless device (or UE), can include processor electronics 1310 such as a microprocessor that implements one or more of the techniques presented in this document. The apparatus 1305 can include transceiver electronics 1315 to send and/or receive wireless signals over one or more communication interfaces such as antenna(s) 1320. The apparatus 1305 can include other communication interfaces for transmitting and receiving data. Apparatus 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the apparatus 1305.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving, by a terminal from a network node, a signaling message comprising an association between one set of one or more reference signals (RSs) and one or more groups, wherein each of the one or more RSs is associated with a usage or a time-domain behavior; and transmitting, by the terminal and based on the association, the one or more RSs, wherein one RS of the one or more RSs is associated with one or more spatial relation information, wherein each of the one or more spatial relation information contains one or more reference RSs, wherein at least one of the one or more groups comprises at least one of a resource, a port group, a resource set, a panel, a sub-array, a spatial filter, a spatial filter group, an antenna group or abeam group, wherein the usage comprises beam management, antenna switching, non-code book based transmission, or codebook-based transmission, and wherein a type of the time-domain behavior is periodic, semi-periodic or aperiodic, and wherein association between the one set of one or more RSs and the one or more groups is based on the one or more reference RSs, wherein each of the one or more reference RSs is associated with the one or more groups, wherein one RS of the one or more RSs is associated with at least one reference RS of the one or more the reference RSs, and wherein the one RS is associated with subset of groups associated with the at least one reference RS and indexes of the subset of groups are communicated by radio resource control (RRC), medium access control (MAC) control element (CE) message or downlink control information (DCI).

2. The method of claim 1, wherein one RS of the one or more RSs comprises a sounding reference signal (SRS).

3. The method of claim 1, wherein the association between the one set of one or more RSs and the one or more groups is based on the usage of the one or more RSs, and wherein at least one of a plurality of criteria is met, the plurality of criteria comprising:
  in response to the usage being beam management or codebook-based transmission, configuring only one group for the one set of the one or more RSs;
  in response to the usage being the beam management or the codebook-based transmission, configuring the one group for each RS of the one set, each of the one or more RSs in the one set belonging to a same group;
  in response to the usage being non-codebook based transmission, configuring one group per RS of the one set; and
  in response to the usage being antenna switching, configuring one group per RS of the one set or configuring one group per port or port group of one RS.

4. The method of claim 1, wherein the association between the one set of one or more RSs and the one or more groups is based on one or more terminal capability signals that comprise at least one of:
  a number of receiver panels or antenna groups to be associated with one transmitter panel or antenna group,
  a number of transmitter ports per receiver port,
  a number of receiver antenna ports to be associated with one transmitter antenna port,
  a total number of transmitter antenna ports,
  a total number of receiver antenna ports,
  a number of receiver panels or antenna groups,
  a maximum number of spatial domain filters to be transmitted simultaneously,
  a maximum number of spatial domain filters to be received simultaneously, or
  a number of transmitter panels or antenna groups.

5. The method of claim 1, wherein the one or more groups are selected from one set of groups, and wherein the one set of groups is configured by radio resource control (RRC).

6. The method of claim 1, wherein each RS of the one set of one or more RSs is a semi-persistent sounding reference signal (SRS), and the signaling message is a medium access control (MAC) control element (CE) message, or wherein each RS of the one set of one or more RSs is a periodic SRS and the signaling message is a radio resource control (RRC) message, or wherein each RS of the one set of one or more RSs is an aperiodic SRS and the signaling message is a radio resource control (RRC) message or a medium access control (MAC) control element (CE) message, or wherein each RS of the one set of one or more RSs is an aperiodic SRS and the association comprises at least one triggering state.

7. The method of claim 6, wherein the at least one triggering state comprises (i) a single triggering state that is associated with one or more SRS, or (ii) a plurality of second-type triggering states, one of the plurality of second-type triggering states being associated with one SRS.

8. The method of claim 1, wherein a medium access control (MAC) control element (CE) signaling jointly encodes identifications of the one or more RSs for one codepoint in a downlink control information (DCI) , and wherein (i) the identifications of the one or more RSs for the one codepoint are jointly encoded based on one simultaneous transmission rule or one grouping criteria for one or more sets of the one or more RSs, (ii) the usage is for the codebook-based transmission, and wherein the one or more RSs to be jointly encoded for the one codepoint is selected from different sets, (iii) the usage is for the non-codebook based transmission, and wherein the one or more RSs to be jointly encoded for the one codepoint is selected from a same set, (iv) the one or more RSs to be jointly encoded for the one codepoint or all codepoints comprise a same type of time domain behavior, (v) one group of the one or more groups is deactivated, and wherein the one codepoint in the DCI associated with the one group is ignored or withdrawn, or (vi) one group of the one or more groups is deactivated, and wherein codepoints in the DCI not associated with the one group or the codepoints in the DCI associated with activated groups are re-numbered.

9. An apparatus for wireless communication, comprising:
  a processor configured to:
    receive, by a terminal from a network node, a signaling message comprising an association between one set of one or more reference signals (RSs) and one or more groups, wherein each of the one or more RSs is associated with a usage or a time-domain behavior; and
    transmit, by the terminal and based on the association, the one or more RSs,
  wherein one RS of the one or more RSs is associated with one or more spatial relation information, wherein each of the one or more spatial relation information contains one or more reference RSs, wherein at least one of the one or more groups comprises at least one of a resource, a port group, a resource set, a panel, a sub-array, a spatial filter, a spatial filter group, an antenna group or a beam group, wherein the usage comprises beam management, antenna switching, non-code book based transmission, or codebook-based transmission, and wherein a type of the time-domain behavior is periodic, semi-periodic or aperiodic, and
  wherein association between the one set of one or more RSs and the one or more groups is based on the one or more reference RSs, wherein each of the one or more reference RSs is associated with the one or more groups, wherein one RS of the one or more RSs is associated with at least one reference RS of the one or more the reference RSs, and wherein the one RS is associated with subset of groups associated with the at least one reference RS and indexes of the subset of groups are communicated by radio resource control (RRC), medium access control (MAC) control element (CE) message or downlink control information (DCI).

10. The apparatus of claim 9, wherein one RS of the one or more RSs comprises a sounding reference signal (SRS).

11. A method of wireless communication, comprising:
transmitting, to a terminal, a signaling message comprising an association between one set of one or more reference signals (RSs) and one or more groups, wherein each of the one or more RSs is associated with a usage or a time-domain behavior; and
wherein one RS of the one or more RSs is associated with one or more spatial relation information, wherein each of the one or more spatial relation information contains one or more reference RSs, wherein at least one of the one or more groups comprises at least one of a resource, a port group, a resource set, a panel, a sub-array, a spatial filter, a spatial filter group, an antenna group or a beam group, wherein the usage comprises beam management, antenna switching, non-codebook based transmission, or code book-based transmission, and wherein a type of the time-domain behavior is periodic, semi-periodic or aperiodic, and
wherein association between the one set of one or more RSs and the one or more groups is based on the one or more reference RSs, wherein each of the one or more reference RSs is associated with the one or more groups, wherein one RS of the one or more RSs is associated with at least one reference RS of the one or more the reference RSs, and wherein the one RS is associated with subset of groups associated with the at least one reference RS and indexes of the subset of groups are communicated by radio resource control (RRC), medium access control (MAC) control element (CE) message or downlink control information (DCI).

12. The method of claim 11, wherein the association between the one set of one or more RSs and the one or more groups is based on the usage of the one or more RSs, and wherein at least one of a plurality of criteria is met, the plurality of criteria comprising:
in response to the usage being beam management or codebook-based transmission, configuring only one group for the one set of the one or more RSs;
in response to the usage being beam management or the codebook-based transmission, configuring the one group is configured for each RS of the one set, each of the one or more RSs in the one set belonging to a same group;
in response to the usage being non-codebook based transmission, configuring one group per RS of the one set; and
in response to the usage being antenna switching, configuring one group per RS of the one set or configuring one group per port or port group of one RS.

13. The method of claim 11, wherein the association between the one set of one or more RSs and the one or more groups is based on one or more terminal capability signals that comprise at least one of:
a number of receiver panels or antenna groups to be associated with one transmitter panel or antenna group,
a number of transmitter ports per receiver port,
a number of receiver antenna ports to be associated with one transmitter antenna port,
a total number of transmitter antenna ports,
a total number of receiver antenna ports,
a number of receiver panels or antenna groups,
a maximum number of spatial domain filters to be transmitted simultaneously,
a maximum number of spatial domain filters to be received simultaneously, or
a number of transmitter panels or antenna groups.

14. An apparatus for wireless communication, comprising: a processor configured to:
transmit, to a terminal, a signaling message comprising an association between one set of one or more reference signals (RSs) and one or more groups, wherein each of the one or more RSs is associated with a usage or a time-domain behavior; and
wherein one RS of the one or more RSs is associated with one or more spatial relation information, wherein each of the one or more spatial relation information contains one or more reference RSs, wherein at least one of the one or more groups comprises at least one of a resource, a port group, a resource set, a panel, a sub-array, a spatial filter, a spatial filter group, an antenna group or a beam group, wherein the usage comprises beam management, antenna switching, non-codebook based transmission, or code book-based transmission, and wherein a type of the time-domain behavior is periodic, semi-periodic or aperiodic, and
wherein association between the one set of one or more RSs and the one or more groups is based on the one or more reference RSs, wherein each of the one or more reference RSs is associated with the one or more groups, wherein one RS of the one or more RSs is associated with at least one reference RS of the one or more the reference RSs, and where in the one RS is associated with subset of groups associated with the at least one reference RS and indexes of the subset of groups are communicated by radio resource control (RRC), medium access control (MAC) control element (CE) message or downlink control information (DCI).

15. The apparatus of claim 14, wherein each RS of the one set of one or more RSs is a semi-persistent sounding reference signal (SRS), and the signaling message is a medium access control (MAC) control element (CE) message, NO or wherein each RS of the one set of one or more RSs is a periodic SRS and the signaling message is a radio resource control (RRC) message, or wherein each RS of the one set of one or more RSs is an aperiodic SRS and the signaling message is a radio resource control (RRC) message or a medium access control (MAC) control element (CE) message, or wherein each RS of the one set of one or more RSs is an aperiodic SRS and the association comprises at least one triggering state.

16. The apparatus of claim 15, wherein the at least one triggering state comprises (i) a single triggering state that is associated with one or more SRS, or (ii) a plurality of second-type triggering states, one of the plurality of second-type triggering states being associated with one SRS.

17. The apparatus of claim 14, wherein one RS of the one or more RSs is associated with one or more spatial relation information, wherein each of the one or more spatial relation information contains one or more reference RSs, wherein at least one of the one or more groups comprises at least one of a resource, a port group, a resource set, a panel, a sub-array, a spatial filter, a spatial filter group, an antenna group or a beam group, wherein the usage comprises beam management, antenna switching, non-codebook based transmission, or codebook-based transmission, and wherein a type of the time-domain behavior is periodic, semi-periodic or aperiodic.

18. The method of claim 1, wherein the association is determined by the network node based on the usage of each of the one or more RSs that is one of beam management, antenna switching, non-codebook based transmission, or codebook based transmission or a time-domain behavior that refers to whether some of the one or more RSs are periodic, semi-periodic or aperiodic;

wherein, for a case that the association is based on the time-domain behavior, each of the one or more groups has an identification, ID, which is indicated by the signaling message and the ID is associated with one RS of the one set or all RSs of the set based on the time-domain behavior, and wherein, for a case that the association is based on the usage, only a single group ID is configured for the all RSs of the set or a group ID associated with each RS within the set is same when the usage is the beam management or the codebook based transmission and the group ID is configured per RS of the one set when the usage is the antenna switching or the non-codebook based transmission.

19. The method of claim 1, wherein each of the one or more groups has an identification (ID) which is indicated by the signaling message and the ID is associated with one RS of the one set or all RSs of the set based on at least one of the usage and a time-domain behavior that refers to whether some of the one or more RSs are periodic, semi-periodic or aperiodic.

* * * * *

UNITED STATES PATENT AND TRADEMARK OFFICE
CERTIFICATE OF CORRECTION

PATENT NO. : 11,991,693 B2
APPLICATION NO. : 17/246432
DATED : May 21, 2024
INVENTOR(S) : Bo Gao et al.

It is certified that error appears in the above-identified patent and that said Letters Patent is hereby corrected as shown below:

In the Specification

1. In Column 1, Line 64, delete "RS s" and insert --RSs--, therefor.
2. In Column 4, Line 5, delete "(other" and insert --other--, therefor.
3. In Column 10, Line 43, delete "in" and insert --is--, therefor.
4. In Column 11, Line 21, delete "more the" and insert --more of the--, therefor.
5. In Column 11, Line 26, delete "more the" and insert --more of the--, therefor.

In the Claims

6. In Column 15, Lines 15-16, in Claim 1, delete "non-code book" and insert --non-codebook--, therefor.
7. In Column 15, Line 25, in Claim 1, delete "more the" and insert --more of the--, therefor.
8. In Column 16, Lines 61-62, in Claim 9, delete "non-code book" and insert --non-codebook--, therefor.
9. In Column 17, Line 4, in Claim 9, delete "more the" and insert --more of the--, therefor.
10. In Column 17, Line 30, in Claim 11, delete "code book-based" and insert --codebook-based--, therefor.
11. In Column 17, Line 39, in Claim 11, delete "more the" and insert --more of the--, therefor.
12. In Column 18, Line 31, in Claim 14, delete "code book-based" and insert --codebook-based--, therefor.
13. In Column 18, Line 40, in Claim 14, delete "more the" and insert --more of the--, therefor.
14. In Column 18, Line 50, in Claim 15, delete "NO or" and insert --or--, therefor.

Signed and Sealed this
Twenty-third Day of July, 2024

Katherine Kelly Vidal
*Director of the United States Patent and Trademark Office*